United States Patent
Belcea (10) Patent No.: US 7,184,712 B2
(45) Date of Patent: *Feb. 27, 2007

(54) SYSTEM AND METHOD FOR IMPROVING THE QUALITY OF RANGE MEASUREMENT BASED UPON HISTORICAL DATA

(75) Inventor: John M. Belcea, West Melbourne, FL (US)

(73) Assignee: MeshNetworks, Inc., Maitland, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/343,493

(22) Filed: Jan. 31, 2006

(65) Prior Publication Data

US 2006/0128315 A1    Jun. 15, 2006

Related U.S. Application Data

(63) Continuation of application No. 10/197,573, filed on Jul. 18, 2002, now Pat. No. 7,046,962.

(51) Int. Cl.
*H04B 17/00*    (2006.01)
(52) U.S. Cl. .................. 455/67.11; 455/67.14; 455/67.16; 455/506; 455/515; 455/115.1
(58) Field of Classification Search ............ 455/67.11, 455/67.14, 67.16, 506, 515, 115.1, 115.3, 455/404.2, 421, 418
See application file for complete search history.

(56) References Cited

U.S. PATENT DOCUMENTS

| 5,381,444 A * | 1/1995 | Tajima .................. 375/141 |
| 6,487,417 B1* | 11/2002 | Rossoni et al. .......... 455/67.16 |
| 2002/0164996 A1* | 11/2002 | Dorenbosch ............... 455/456 |
| 2003/0134648 A1* | 7/2003 | Reed et al. ............... 455/456 |
| 2003/0232598 A1* | 12/2003 | Aljadeff et al. ........... 455/41.2 |

* cited by examiner

*Primary Examiner*—Matthew Anderson
*Assistant Examiner*—Minh Dao
(74) *Attorney, Agent, or Firm*—Randi L. Karpinia (57) ABSTRACT

A system and method for applying an algorithm to distance measurements between nodes in an ad-hoc communications network (100). The algorithm is located at an individual node (102, 106, 107) of the ad-hoc network (100) and processes collected data via a multi-path filter to ensure that range measurement data is correct, and if so, include such measurement data in a historical data matrix in which old measurement data is eliminated. During periods where received signals are unable to provide correct distance measurements due to reflections affecting the path between nodes or media absorption or radio energy, distance estimates may be obtained from this accurate historical data.

23 Claims, 9 Drawing Sheets

SYSTEM AND METHOD FOR IMPROVING THE QUALITY OF RANGE MEASUREMENT BASED UPON HISTORICAL DATA

This application is a continuation of prior application Ser. No. 10/197,573, filed Jul. 18, 2002, now U.S. Pat. No. 7,046,962 the entire contents being incorporated herein by reference.

BACKGROUND OF THE INVENTION

1. Field of the Invention

The present invention relates to a system and method of applying an algorithm to distance measurements between nodes in an ad-hoc communications network to ensure accurate range measurement data is maintained. More particularly, the present invention relates to a system and method for using an algorithm at an individual node of an ad-hoc network to ensure that range measurement data is correct, and if so, to add the measurement data to a historical data matrix in which old measurement data is eliminated. During periods where received signals are unable to provide correct distance measurements due to reflections affecting the path between nodes or media absorption or radio energy, distance estimates may be obtained from this accurate historical data.

2. Description of the Related Art

In recent years, a type of mobile communications network known as an "ad-hoc" network has been developed to address the needs of multiple mobile device communication beyond traditional infrastructure coverage. In this type of network, each user terminal (hereinafter "mobile node") is capable of operating as a base station or router for other mobile nodes within the network, thus eliminating the need for a fixed infrastructure of base stations. Accordingly, data packets being sent from a source mobile node to a destination mobile node are typically routed through a number of intermediate mobile nodes before reaching the destination node.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004 and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

The mobile nodes of such networks may assume any number of random positions within the network, making exact node location determinations when needed difficult. For computing node geographical coordinates in such ad-hoc wireless networks, algorithms in use at individual nodes in typical networks use the "Time Of Arrival" (TOA) measurement technique. As can be appreciated by one skilled in the art, a TOA measurement provides the distance between mobile nodes and wireless routers, which are used as references, for computing the mobile node position. The measurements are based upon signal propagation times, specifically the time a signal needs for traveling at the speed of light between a mobile node and fixed stations.

More sophisticated ad-hoc networks are also being developed which, in addition to enabling mobile nodes to communicate with each other as in conventional ad-hoc networks, further enable the mobile nodes to access fixed networks and communicate with other types of user terminals, such as those on the public switched telephone network (PSTN) and the Internet. Details of these advanced types of ad-hoc networks are described in U.S. Pat. No. 7,072,650 entitled "Ad Hoc Peer-to-Peer Mobile Radio Access System Interfaced to the PSTN and Cellular Networks", issued on Jul. 4, 2006, in U.S. Pat. No. 6,807,165 entitled "Time Division Protocol for an Ad-Hoc, Peer-to-Peer Radio Network Having Coordinating Channel Access to Shared Parallel Data Channels with Separate Reservation Channel", issued on Oct. 19, 2004 and in U.S. Pat. No. 6,873,839 entitled "Prioritized-Routing for an Ad-Hoc, Peer-to-Peer, Mobile Radio Access System", issued on Mar. 29, 2005, the entire content of each being incorporated herein by reference.

Accordingly, a need exists for a system and method to filter out measurements that are incorrect and provide at any time, an estimate of the distance between terminals, even if they are not in direct radio contact.

SUMMARY OF THE INVENTION

An object of the present invention is to provide a system and method to correctly estimate the distance between nodes of a wireless ad-hoc communications network during periods where received signals are following both direct and reflected paths between nodes.

Another object of the present invention is to provide a system and method for maintaining accurate historical data relating to past range measurements to provide distance estimates during periods where received signals are unable to provide distance measurements due to reflected path transmissions between nodes.

These and other objects are substantially achieved by providing a system and method for applying an algorithm to distance measurements between nodes in an ad-hoc communications network. The algorithm is located at an individual node of the ad-hoc network and processes collected data via a multi-path filter to ensure measurement data is within a specific range, and if so, to include such measurement data in a historical data matrix in which old measurement data is eliminated. During periods where received signals are unable to provide distance measurements due to reflected path transmissions between nodes or media absorption, distance estimates may be obtained from accurate historical data.

BRIEF DESCRIPTION OF THE DRAWINGS

These and other objects, advantages and novel features of the invention will be more readily appreciated from the following detailed description when read in conjunction with the accompanying drawings, in which.

DETAILED DESCRIPTION OF THE PREFERRED EMBODIMENTS

Figure 1:
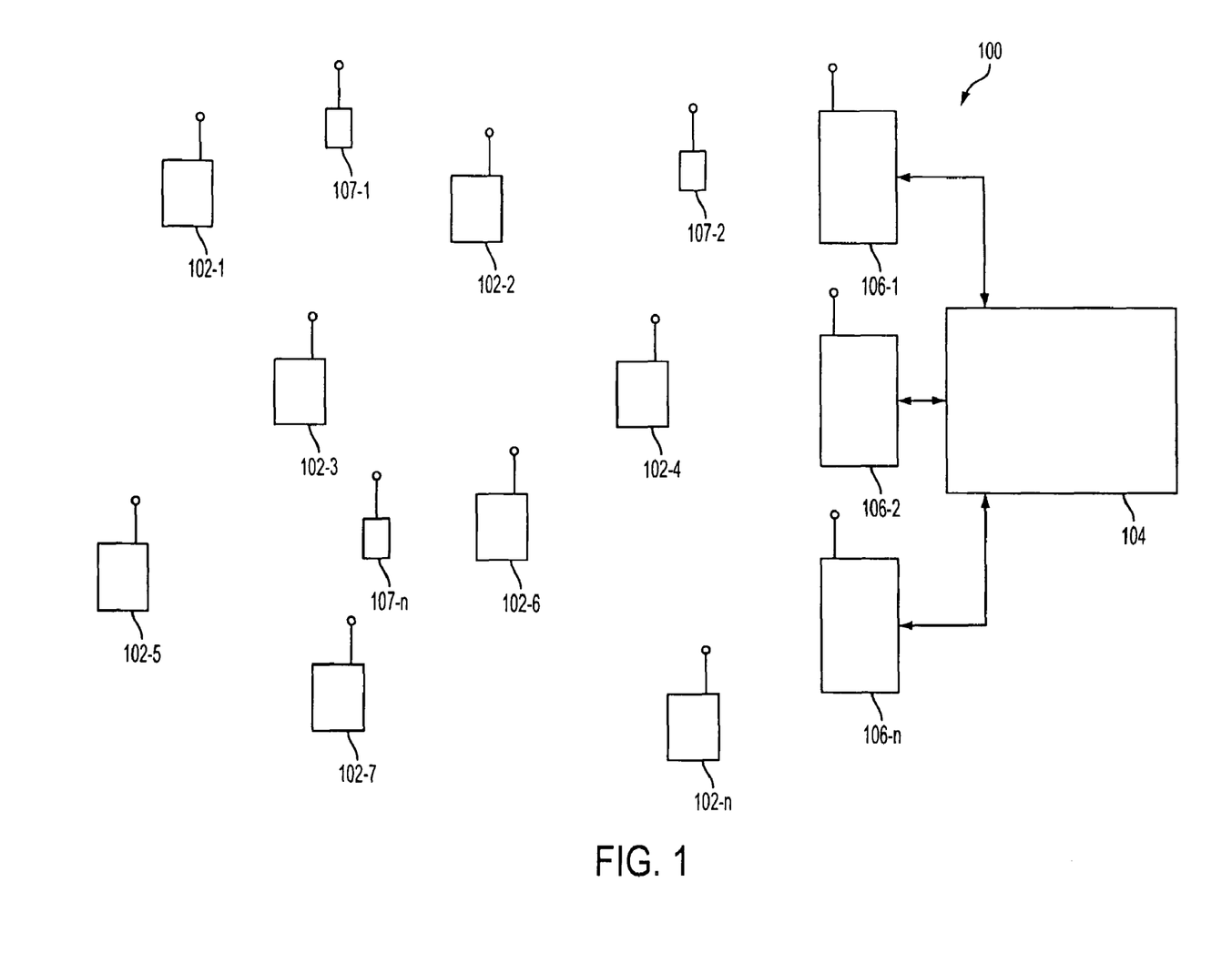
FIG. 1 is a block diagram of an example of an ad-hoc wireless communications network including a plurality of nodes employing an embodiment of the present invention.

FIG. 1 is a block diagram illustrating an example of an ad-hoc packet-switched wireless communications network 100 employing an embodiment of the present invention. Specifically, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, . . . 106-n (referred to generally as nodes 106 or access points 106), for providing nodes 102 with access to the fixed network 104. The fixed network 104 can include, for example, a core local access network (LAN), and a plurality of servers and gateway routers, to provide network nodes with access to other networks, such as other ad-hoc networks, the public switched telephone network (PSTN) and the Internet. The network 100 further can include a plurality of fixed routers 107-1 through 107-n (referred to generally as nodes 107, fixed routers 107 or wireless routers 107) for routing data packets between other nodes 102, 106 or 107. Because they are not mobile, routers 107 are preferred for use as reference nodes for mobile node position measurements. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. Pat. Nos. 7,072,650, 6,807,165 and 6,873,839 which are referenced above.

Figure 2:
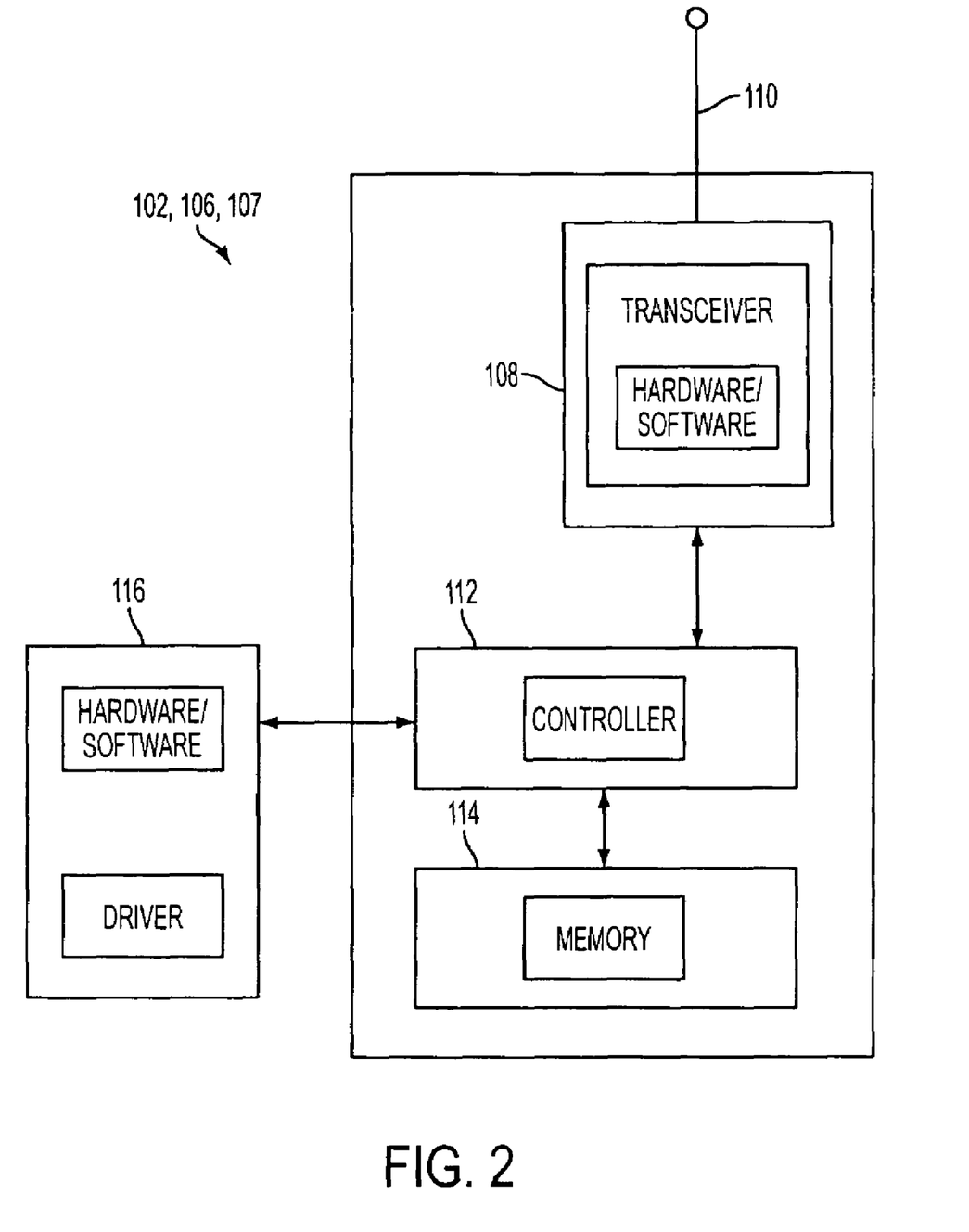
FIG. 2 is a block diagram of an example of a wireless node as shown in FIG. 1.

As shown in FIG. 2, each node 102, 106 and 107 has a transceiver including a transmitter and a receiver, which collectively can be referred to as a modem 108. As shown in FIG. 2, each node 102, 106 and 107 includes a modem 108 which is coupled to an antenna 110 and is capable of receiving and transmitting signals, such as packetized signals, to and from other nodes 102, 106 and 107, under the control of a controller 112. The packetized data signals can include, for example, voice, data or multimedia information, and packetized control signals, including node update information.

As can be appreciated by one skilled in the art, the nodes 102, 106 and 107 are capable of communicating with each other directly, or via one or more other nodes 102, 106 or 107 operating as a router or routers for packets being sent between nodes, as described in U.S. Pat. No. 5,943,322 to Mayor, which is incorporated herein by reference, and in U.S. patent Nos. 7,072,650, 6,807,165 and 6,873,839 which are referenced above.

As further shown in FIG. 2, certain nodes, especially mobile nodes 102, can include a host 116 which may consist of any number of devices, such as a notebook computer terminal, mobile telephone unit, mobile data unit, or any other suitable device. Each node 102, 106 and 107 also includes the appropriate hardware and software to perform Internet Protocol (IP) and Address Resolution Protocol (ARP), the purposes of which can be readily appreciated by one skilled in the art. The appropriate hardware and software to perform transmission control protocol (TCP) and user datagram protocol (UDP) may also be included.

The modem 108 of each node also includes the capability to identify, differentiate and measure the arrival time of signals received at a node 102, 106 and 107, both via direct paths and reflected paths, from other nodes of the network. Algorithms in use at each node use the "Time Of Arrival" (TOA) measurement technique, and may provide the distance between nodes for computing individual node positions. The measurements are based upon signal propagation times, specifically the time a signal needs for traveling at the speed of light between a mobile node and fixed node, used as a reference.

As can be appreciated by those skilled in the art, the measurement of direct path signal arrival times is useful for identifying and measuring distances between nodes, such as between a mobile node 102 and a wireless router 107. The precision of this distance measurement has a direct impact on the accuracy of the geographical position determination of the mobile node as computed by a device, such as a "Location Service" module.

As shown in FIGS. 1 and 2, each node 102, 106 and 107 has the capability to distinguish and identify signals received via a direct path from signals received via a reflected path. However such identification is very difficult or almost impossible when adverse conditions prevent one node from communicating with another node in a direct path. For example, the communication between two nodes located in a building with concrete floors is often subject to signal reflection, diffraction and diffusion via objects located outside the building. In such conditions, the signals received via reflected paths could be much stronger than the signals received via the direct path, as the direct signal is attenuated by passing through concrete floors or absorbing objects. Unfortunately, such large level differences between the direct and secondary, or reflected, signal makes the identification of the direct signal almost impossible in some cases. Still further, when a mobile node enters a temporary "shadow" of an obstruction, it can communicate with other nodes only through reflected signals. Although such communication does not dramatically affect the quality of data transferred in the network, the measurement of direct signal arrival time for use in distance measurements becomes impossible. At such times, accurate historical data may be used to provide a distance estimate, however the estimate accuracy will rely heavily upon the historical data maintained at the node.

For example, in FIG. 1, the direct path between a mobile node 102 and a wireless router 107 may become continuously or temporarily obstructed due to the environment of the network 100. If the direct path between a node 102 and 107 is continuously obstructed, signals received at either node will consist largely of reflected signals received via an indirect path. The embodiment of the present invention described below presents a multi-path filter contained within an algorithm which may be used at a node to provide a correct distance between nodes if at least 10% of received signals are following a direct path between nodes. In cases where the direct path is obstructed only temporarily, but during which period all received signals are following reflected paths preventing accurate distance measurements from received signals using TOA techniques, the filter embodiment described below can still provide a correct distance estimate for almost a minute using a matrix of historical data maintained at the node.

The multi-path filter described below may be located at each node 102, 106 and 107 of FIG. 1, and may be located either at the modem of the node 108 or at the node host 116. As stated above, each node has the capability to distinguish and identify signals received from another node via direct and reflected paths, and using such signals and path information, determine and collect node distance values.

The multi-path filter of each node used to detect these alternate path signals and provide accurate distances includes two stages. In a first stage of the filter, the measured distance between nodes, such as a mobile node 102 and router node 107, is checked against previously measured distances. In this example, the router node, or node 107 is used as a reference for distance measurement between the router 107 and a single mobile node 102. The speed of distance change, or the relative speed between nodes, is used to compute an expected distance. If the measured distance is very long compared with the expected distance, it is rejected and not considered for improving the collected information.

A new measurement is accepted if it is smaller than the expected distance plus a fraction of the standard deviation of errors. In the present embodiment this fraction was selected as 30%, but various applications may require different values. The standard deviation is computed using all measurements, regardless of the fact that they were rejected or not as presented in equation (5). The expected distance is computed with the relation presented in equation (1) where V an $d_0$ are computed using the Least Square Method.

In the second stage of the filter all range measurements that were not rejected are considered as "historical data".

The "storage" for the historical data is in fact the matrix of a Least Square Method applied to the linear model of the distance variation between nodes. The model equation is presented in equation (1) as:

$$d(t)=V*t+d_0 \quad (1)$$

The unknown elements in the model equation (1) are the speed of the distance variation V and the initial distance $d_0$, used then to determine the distance between nodes d(t).

The system of equations, or algorithm, associated to the linear model of range change is shown in equation (2) below.

$$\begin{cases} V\sum_{i=1}^{n} t_i^2 + d_0\sum_{i=1}^{n} t_i = \sum_{i=1}^{n} d_i t_i \\ V\sum_{i=1}^{n} t_i + n*d_0 = \sum_{i=1}^{n} d_i \end{cases} \quad (2)$$

In equation (2), the variables $d_i$ are the measured distances between the nodes, or in our example, mobile node 102 and router node 107, and variables $t_i$ are the times when distances were measured. For use in equation (2) however, distances $d_j$ have to pass the first stage of the multi-path filter. As described above, in the first stage filter, the measured distance between nodes is checked against previously measured distances and the speed of distance change, or the relative speed between nodes, is used to compute an expected distance. If the measured distance is very long, it is rejected and not considered for improving the collected information.

For very large collections of data, the number in the matrix associated with equation (2) may become very large due to summation of a large number of data. Therefore, to prevent the numbers within the matrix associated with equation (2) from becoming too large, a "forget factor" is used. The forget factor creates a variable weight w for each set of measurements. After considering the forget factor, where 0<w<1, equation (2) becomes equation (3).

$$\begin{cases} V\sum_{i=1}^{n} w^{n-i}t_i^2 + d_0\sum_{i=1}^{n} w^{n-i}t_i = \sum_{i=1}^{n} w^{n-i}d_i t_i \\ V\sum_{i=1}^{n} w^{n-i}t_i^2 + d_0\sum_{i=1}^{n} w^{n-i} = \sum_{i=1}^{n} w^{n-i}d_i \end{cases} \quad (3)$$

Since the value of w is less than one (w<1), the weight of older records becomes very small and the algorithm essentially "forgets" very old measurements, and allows substitutions as directed by equation (4).

$$a_{1,1} = \sum_{i=1}^{n} w^{n-i}t_i^2 \quad (4)$$

$$a_{1,2} = a_{2,1} = \sum_{i=1}^{n} w^{n-i}t_i$$

$$a_{2,2} = \sum_{i=1}^{n} w^{n-i}$$

$$b_1 = \sum_{i=1}^{n} w^{n-i}d_i t_i$$

-continued $$b_2 = \sum_{i=1}^{n} w^{n-i} d_i$$

After making the substitutions indicated in equation (4), the system of equations can be rewritten as shown in equation (5).

$$\begin{cases} a_{1,1} V + a_{1,2} d_0 = b_1 \\ a_{2,1} V + a_{2,2} d_0 = b_2 \end{cases} \quad (5)$$

The values of V and $d_0$ computed from equation (5) are then used for computing the expected distance $d(t_i)$ and the current error $\epsilon_i$ of the measured distance $d_i$. The individual error $\epsilon_i$ is then used for computing the standard deviation of errors σ in equation (6).

$$\varepsilon_i = d_i - (v * t_i + d_0) \quad (6)$$

$$\sigma^2 = \frac{\sum_{i=1}^{n} \varepsilon_i^2}{\left(\sum_{i=1}^{n} w^{n-i}\right) - 2}$$

If the standard deviation of errors σ becomes too large, the system of equations (1) through (6) is erased and the algorithm starts again. The limit of the standard deviation when the algorithm is restarted depends on the requirements of the application using the algorithm. A very large standard deviation is a sign that the linear approximation of distance variation does not match the actual distance value. This situation typically occurs when the mobile node 102 changes suddenly the moving direction.

The multi-path filter described above may be tested under various conditions using randomly generated data. For each test, two charts may be created showing a measurement variation and error distribution, as shown in FIGS. 4–15. Although the multi-path filter deals with time measurements, each test indicates error in terms of distance, or meters. Filter input is provided as propagation times between a mobile node 102 and wireless router 107, therefore as appreciated by those skilled in the art, converting propagation times to distances merely requires application of a conversion factor equal with the speed of light.

Testing the use of the multi-path filter in distance measurements requires calculating a distance between two nodes, as various factors are used to simulate noise generation and reflected path signals. In the example shown in FIG. 3, a distance 120 is to be measured between a mobile node 102 which is moving at a velocity of 30 m/s on a straight course, such as a highway, and a fixed wireless router 107 in accordance with the embodiment of the present invention described in equations (1) through (6).

Figure 3:
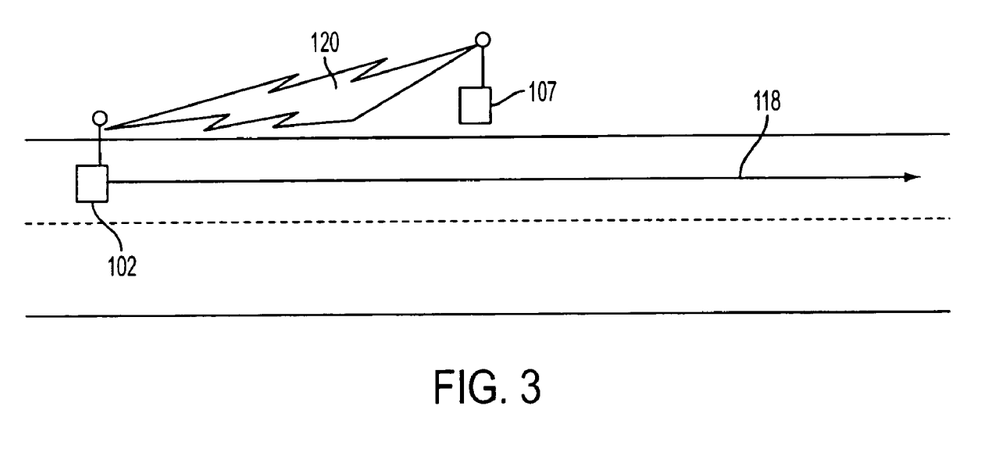
FIG. 3 is a block diagram of an example of a technique for performing distance measurement in accordance with an embodiment of the present invention.

As shown in FIG. 3, the mobile node is traveling on a straight path 188, approaching a fixed router 107 from a distance of approx. −1100 m, passing at a closest distance of approx. 5 m, and moving away to a distance of approx. +1100 m. The router 107, used as a reference in this example, is located at a position 5 m from the mobile moving path 118.

The distance 120, or $d_i$ from equation (2), between the router 107 and the mobile node 102 in FIG. 3 is measured at a first time, or $t_1$ from equation (2), when the mobile node 102 is approx. −1100 m from the router 107, and thereafter at time intervals $t_i$ for a duration of approximately 70 seconds, depending upon the speed of travel at node 102. As can be appreciated by one skilled in the art, the movement configuration, measurement intervals and specific nodes used in FIG. 3 are presented as an example of the use of the multi-path filter in accordance with an embodiment of the present invention. Many other configurations may be used in accordance with this, or other embodiments.

In the example of FIG. 3, after 33.333 seconds, the distance 120 between nodes 102 and 107 is minimal (i.e. 5 m) as the mobile node passes by the fixed router. At the end of the measurement window, the distance between nodes is approximately +1100 meters. The router node 107 is located at the center point, or 0.0 m on the travel route 118 of mobile node 102, therefore one half of the measurements $d_i$ are taken as node 102 approaches node 107, and one half are taken as node 102 moves away from node 107. When describing locations along the measurement route, a negative number is used to describe positions along the approaching path (i.e. on the left side of the fixed router in FIG. 3), and positive numbers are used to describe positions along the path moving away from the router node 107 (i.e. on the right side of the fixed router in FIG. 3).

Figure 4:
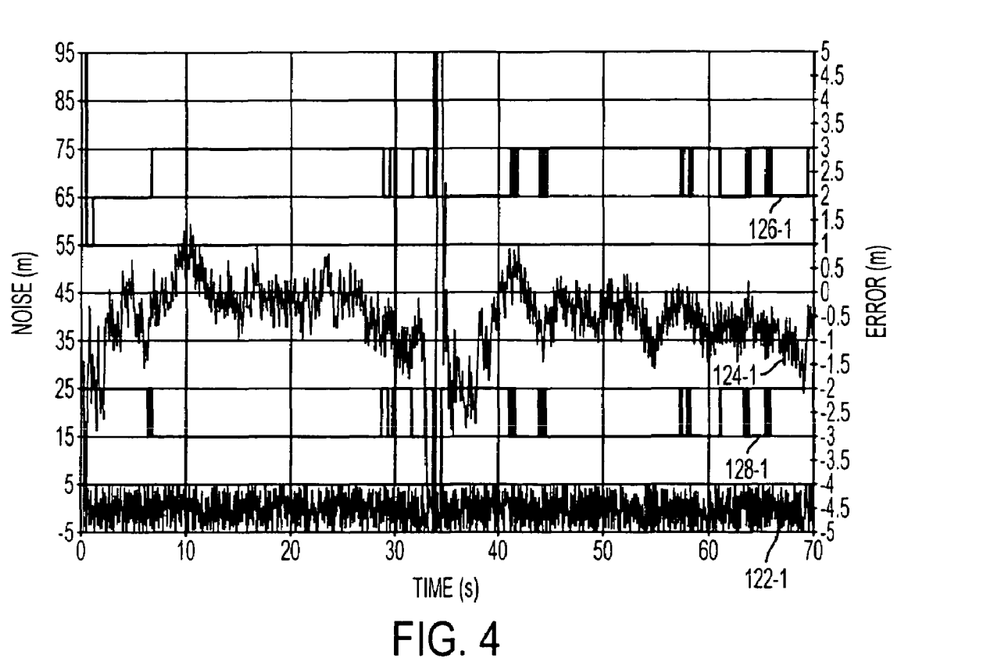
FIG. 4 is a plot illustrating an example of measurement signal characteristics in a first distance measurement scenario in accordance with an embodiment of the present invention.
Figure 5:
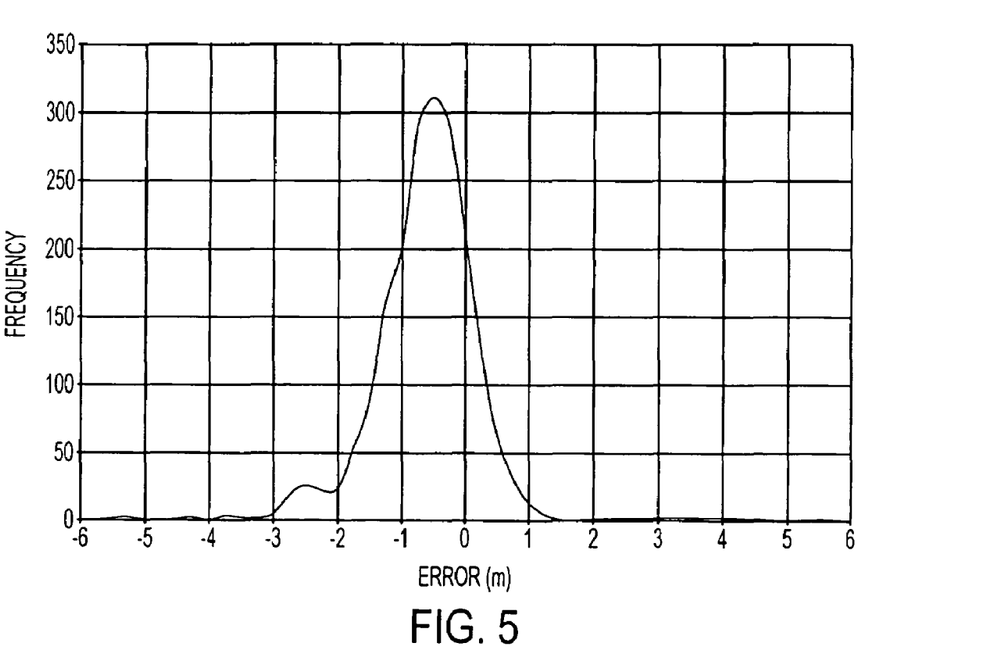
FIG. 5 is a plot illustrating an example of measurement error deviation of the characteristics of FIG. 4.

FIGS. 4 through 15 show distance information gathered by the distance algorithm at either node 102 or node 107, and processed via the multi-path filter described above. FIGS. 4, 6, 8, 10, 12 and 14 each show the variation of distance 120 measurement errors as a function of time. FIG. 4 shows an ideal case of distance measurement between a mobile node 102 and a router node 107 as shown in FIG. 3. FIGS. 4 and 5 plot distance data collected and processed when there are no reflected path signals and noise effect offsets are within +/−5 m.

Figure 6:
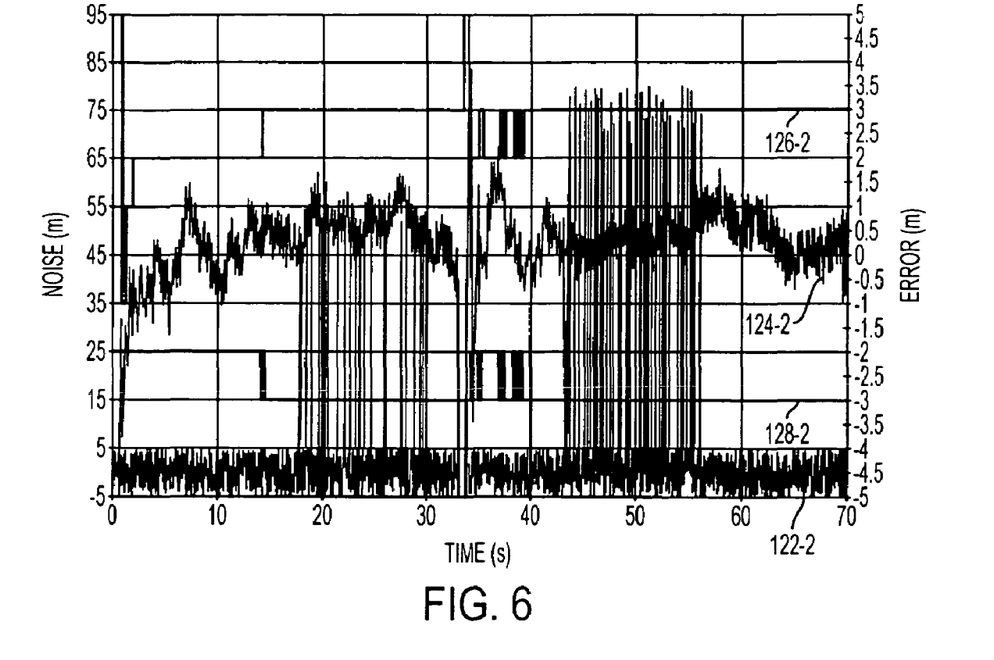
FIG. 6 is a plot illustrating an example of measurement signal characteristics in a second distance measurement scenario in accordance with an embodiment of the present invention.
Figure 7:
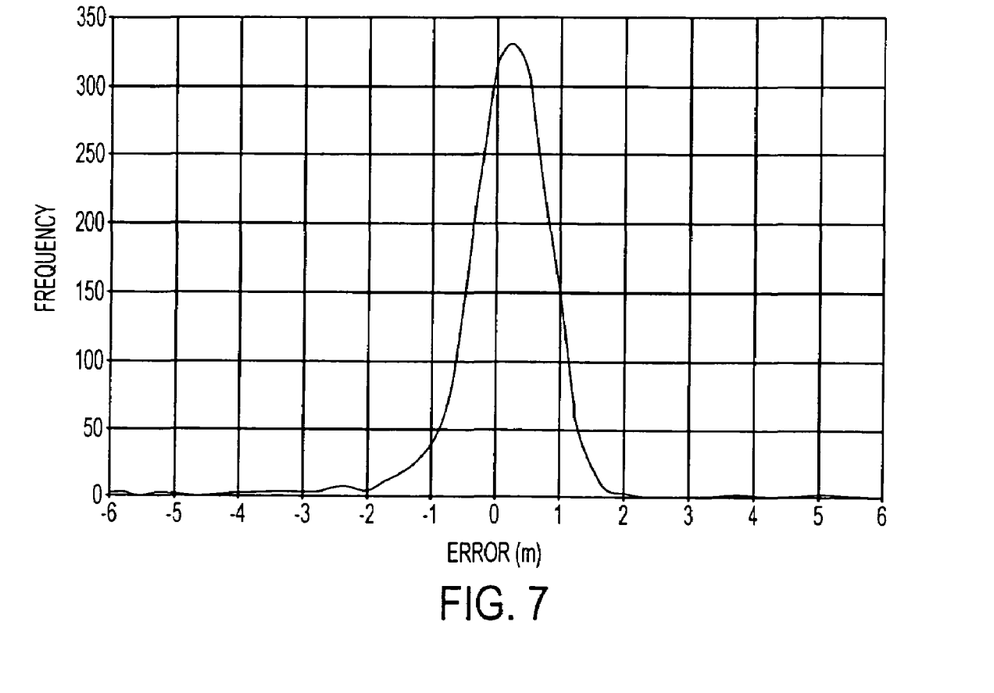
FIG. 7 is a plot illustrating an example of measurement error deviation of the characteristics of FIG. 6.

FIG. 6 shows another case of distance measurement between a mobile node 102 and a router node 107 as shown in FIG. 3. FIGS. 6 and 7 plot distance data collected and processed when there are partial obstructions between nodes 102 and 107 at distances from −500 m to −100 m and from +300 m to +700 m.

Figure 8:
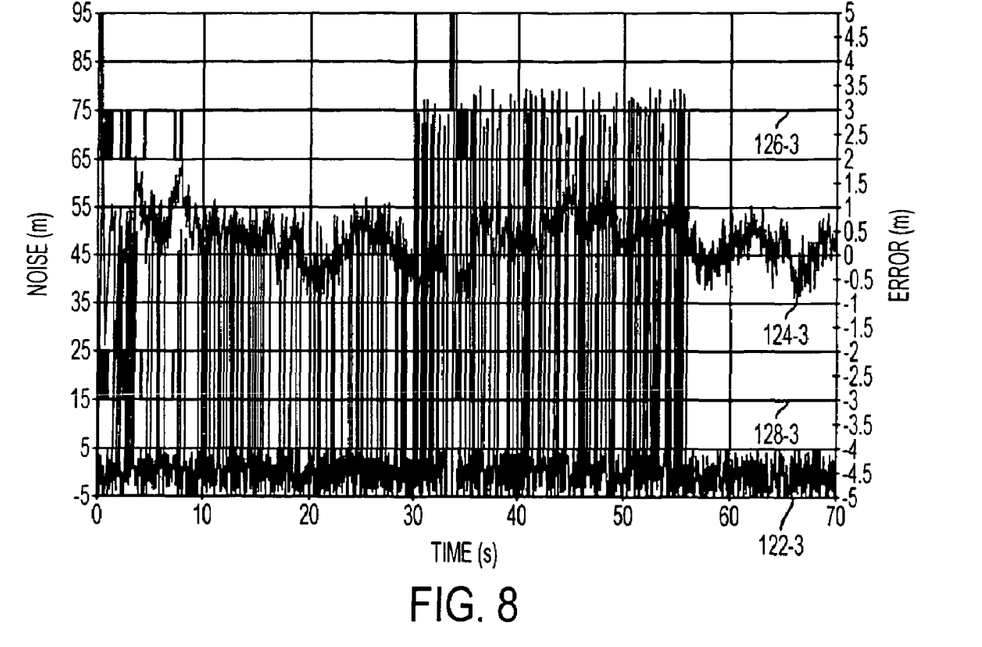
FIG. 8 is a plot illustrating an example of measurement signal characteristics in a third distance measurement scenario in accordance with an embodiment of the present invention.
Figure 9:
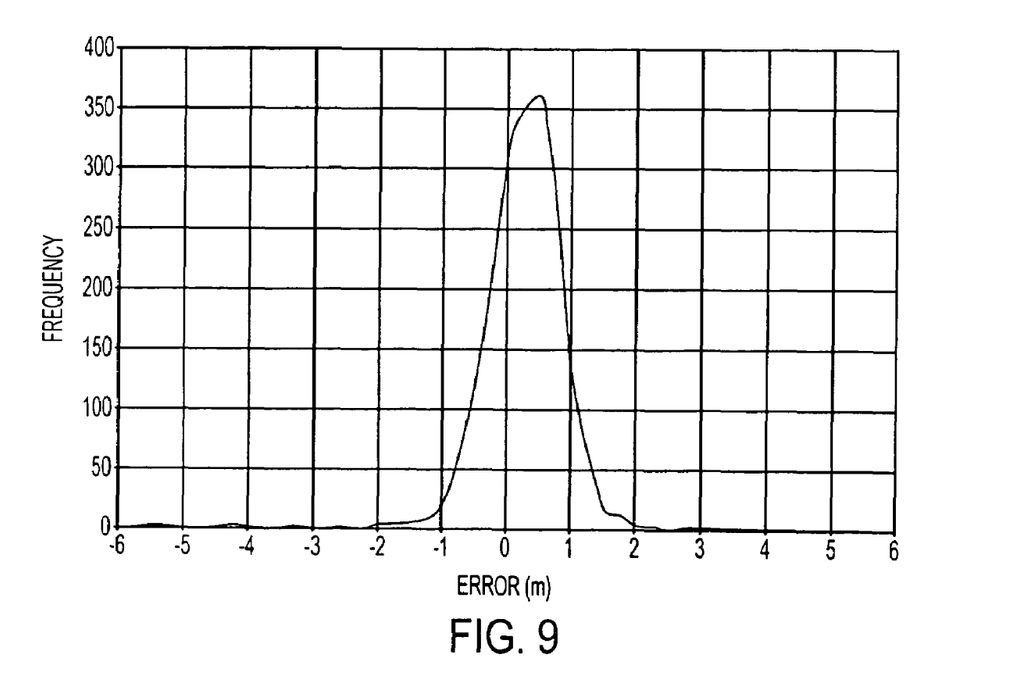
FIG. 9 is a plot illustrating an example of measurement error deviation of the characteristics of FIG. 8.

FIG. 8 shows another case of distance measurement between a mobile node 102 and a router node 107 as shown in FIG. 3. FIGS. 8 and 9 plot distance data collected and processed when there are continuous obstructions between nodes 102 and 107, and the predominant signal reflected path is 50 m to 75 m longer than the direct path.

Figure 10:
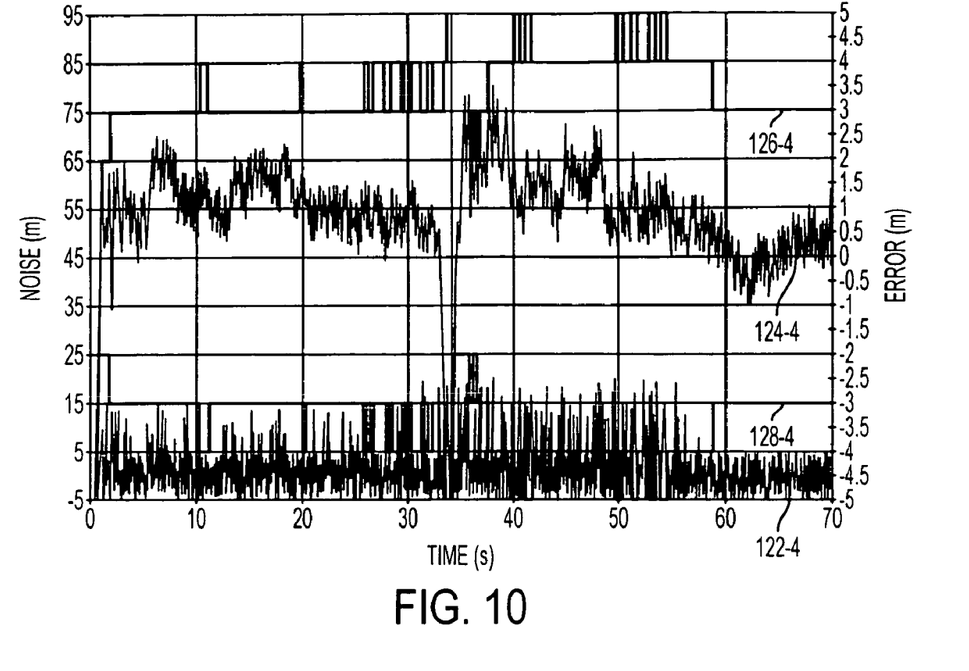
FIG. 10 is a plot illustrating an example of measurement signal characteristics in a fourth distance measurement scenario in accordance with an embodiment of the present invention.
Figure 11:
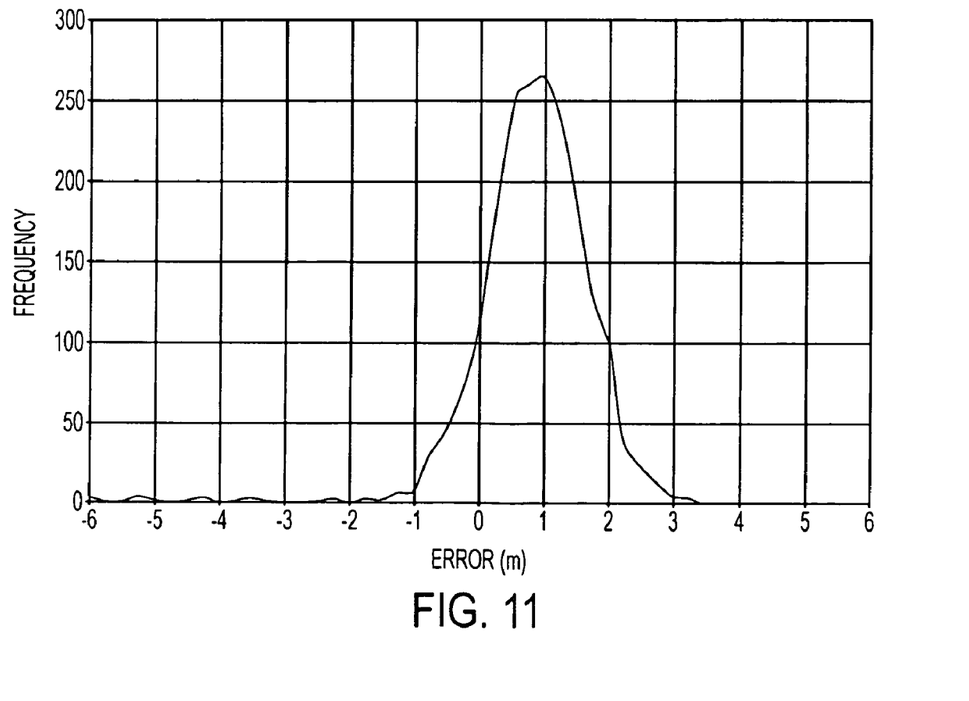
FIG. 11 is a plot illustrating an example of measurement error deviation of the characteristics of FIG. 10.

FIG. 10 shows another case of distance measurement between a mobile node 102 and a router node 107 as shown in FIG. 3. FIGS. 10 and 11 plot distance data collected and processed when there are continuous obstructions between nodes 102 and 107, as in FIGS. 8 and 9, and the predominant signal reflected path length increase varies. In FIGS. 10 and 11, the predominant signal reflected path is 10 m longer than the direct path when the mobile node 102 is left of −100 m (i.e. mobile node 102 is at a distance of −1100 m to −100 m). And the predominant signal reflected path is 15 m longer than the directed path when the mobile node 102 is to the left of +700 m (i.e. mobile node 102 is at a distance of −100 m to +700 m).

Figure 12:
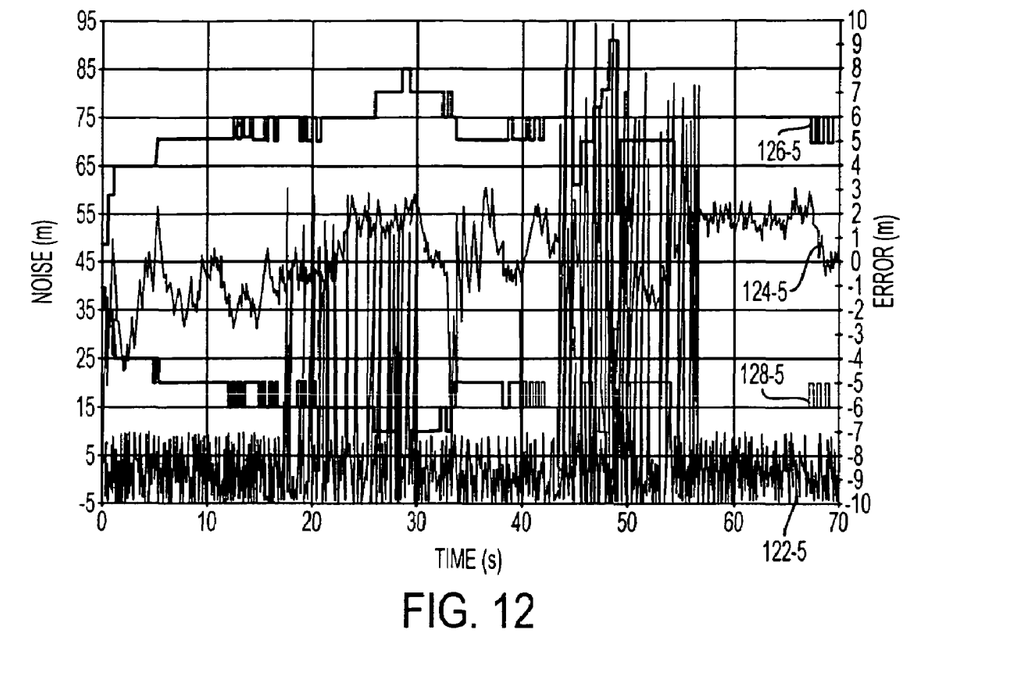
FIG. 12 is a plot illustrating an example of measurement signal characteristics in a fifth distance measurement scenario in accordance with an embodiment of the present invention.
Figure 13:
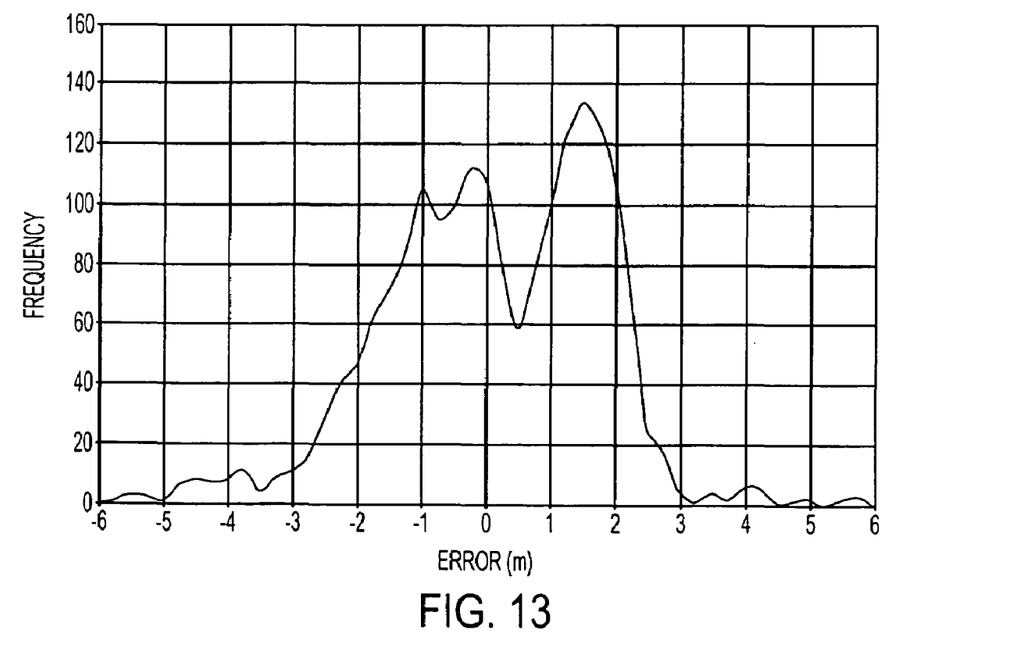
FIG. 13 is a plot illustrating an example of measurement error deviation of the characteristics of FIG. 12.

FIG. 12 shows another case of distance measurement between a mobile node 102 and a router node 107 as shown in FIG. 3. FIGS. 12 and 13 plot distance data collected and processed when there is high noise levels present along the path 118 and obstructions between nodes 102 and 107 from −500 m to −100 m and from +300 m to +700 m. Such high noise could be caused accidentally by other radio devices transmitting on the same or close frequencies and located in the same area, or could be caused by intentional jamming occurring in war situations.

Figure 14:
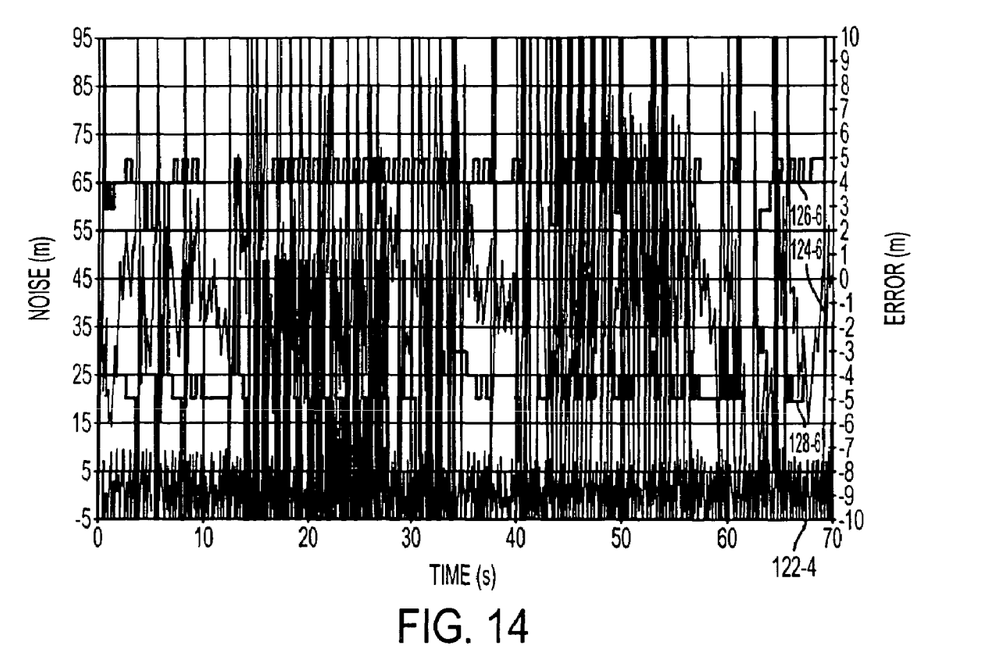
FIG. 14 is a plot illustrating an example of measurement signal characteristics in a sixth distance measurement scenario in accordance with an embodiment of the present invention.
Figure 15:
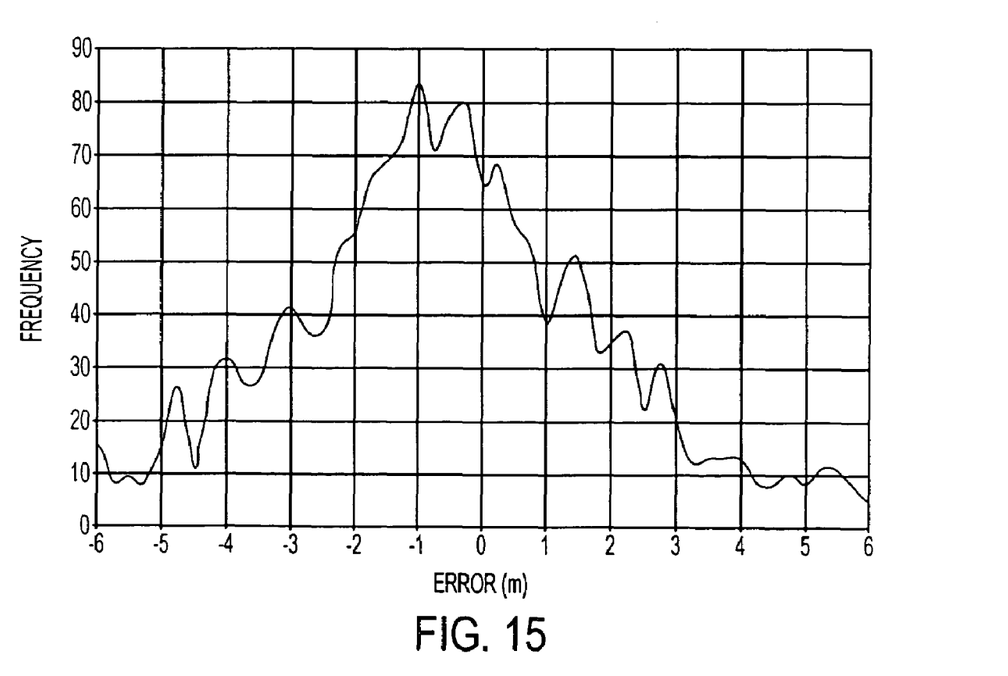
FIG. 15 is a plot illustrating an example of measurement error deviation of the characteristics of FIG. 14.

FIG. 14 shows another case of distance measurement between a mobile node 102 and a router node 107 as shown in FIG. 3. FIGS. 14 and 15 plot distance data collected and processed when the filter restart trigger is changed from σ>10 m to σ>5 m.

The line 122 of FIGS. 4, 6, 8, 10, 12 and 14, shows the distance error of the signal arrival time affected by multi-path noise and short time fading. The difference between the real distance 120 and the predicted distance using the algorithm including the multi-path filter in accordance with an embodiment of the present invention is presented by line 124 in FIGS. 4, 6, 8, 10, 12 and 14.

Additionally, in each of FIGS. 4, 6, 8, 10, 12 and 14, the ±σ envelope is shown bounded by lines 126 and 128. The value of the standard deviation of errors σ is computed from the difference between the predicted position and the measured position only for these measurements that have passed the first filter stage of the multi-path filter described above. At this first stage however, real errors shown by line 122 in FIGS. 4, 6, 8 and 10 are unknown, thus they cannot be used for evaluating the standard deviation. FIGS. 5, 7, 9, 11, 13 and 15 each show the distribution of errors from FIGS. 4, 6, 8, 10, 12 and 14, typically as a normal distribution population.

Systematic errors may be introduced by the algorithm of the multi-path filter when there is no multi-path data, such as when all data is correct. In such a case the first filter stage discards away a large number of measurements with positive errors and the predicted distance is shifted toward smaller values than normal. For instance, in optimal conditions the modem measures the time of flight (TOF) on the direct path. The modem provides that measurement as number of clock "ticks" (Tc) which is an integer number, each equaling 31.25 ns. When the mobile node moves in relation to the fixed router, the difference between the real distance and the distance computed from TOF has an error no larger than ½ Tc or smaller than ±9.33½=±4.67 m. All errors are then uniformly distributed in the interval (+5 m, −5 m). Therefor, in ideal conditions when no multipath is involved, all measurements are within ±5 m from the real value. Since no multipath is involved, all measurements are correct, thus all must be considered as historical data, which is shown in FIG. 4. Since all measurements are within ±5 m from the correct values, the standard deviation of errors is about 3 m. The first stage filter drops all measurements with errors larger than the expected value +0.3*3=expected value+1 m.

The filter retains only values that have errors within the interval (+1 m, −5 m). Because the distribution of errors is uniform, the average position of this interval would be −2 m. Therefore, if both stations are not moving and all measurements are correct, the filter would provide results that have systematic errors of −2 m, the center of the (+1 m, −5 m) interval.

When the algorithm of the multi-path filter restarts due to a very large standard deviation value, the lines of σ envelopes 126 and 128, and the lines of errors 122 show discontinuities. Normally this happens when the mobile node 102 passes the fixed router 107 at about 33 seconds from initial measurements, and the distance variations detected transition from negative to positive values.

Furthermore, tests of the embodiment of the present invention show that the value of the standard deviation σ is always about 60% of the value of error of path data measured by a node. For example, when the distance 120 measured by either node is affected by ±5 m noise, the σ of the predicted distance is ±3 m.

In a first test scenario, the values of which are shown in FIGS. 4 and 5, the received signal is not affected by any reflected path and the noise effect indicated by 122-1 is set to ±5 m. Scenario one is the ideal case that occurs when the line of sight between mobile node 102 and the wireless router 107 of FIG. 3 is not obstructed, making the direct signal very strong. The ±5 m random error is specific to certain systems that make measurements in terms of $T_c$, where one $T_c$ equals 32.125 ns, or alternatively, 9.64 m. Since the measurements of distance 120 are in terms of $T_c$, each measurement has an error within ±0.5 $T_c$ or ±4.67 m (rounded to ±5 m).

The chart of errors for scenario 1 shows that the measured distance 120 between the mobile node 102 and the router 107 of FIG. 3, has an accuracy between +1.5 and −2 m, while the standard deviation of errors is between 2 and 3 meters as shown in FIGS. 4 and 5. There is a discontinuity in the middle of the chart, when the mobile node 102 approaches the fixed router 107. The peak of the error frequency is shifted right by 0.5 m due to the fact that in this case, no incorrect measurements were encountered and the first stage filter eliminated many "good" measurements.

In a second test scenario, partial obstructions between mobile node 102 and router 107 are considered. When the mobile node 102 is between −500 and −100 m from the wireless router, the path to the node 102 is partially obstructed. In this case, 10% of signals received at the router 107 are from reflected paths, while 90% are direct signals. The reflected paths are affected by a random extra path length up to 50 m. After the mobile node 102 passes the wireless router 107 and the distance is between +300 and +700 m, a second obstruction occurs. In this case 85% of received signals are from a direct path while 15% are affected by reflection with a random extra path length up to 75 m. The chart of errors shows a standard deviation of about 3 m, while the chart with the distribution of errors shows that most of the measurements are within ±2 m of the real distances as shown in FIGS. 6 and 7.

In a third test scenario, the path between the mobile node 102 and the wireless router 107 is obstructed from the beginning until the mobile node passes the router and is +700 m away. At the beginning, 10% of received signals are from reflected paths and are affected by a random extra path length of 50 m. When the mobile node 102 is at −100 m from router 107, the modem of the mobile node 102 starts picking another reflected path. This affects 15% of received signals, adding a random extra path length of 75 m. The resulting charts show almost constant standard deviation at 3 m and almost all measurements are affected by errors smaller than ±2 m as shown in FIGS. 8 and 9.

In a fourth test scenario, the case is similar with the third test scenario, except for the length of the extra path. In the fourth scenario, the length of the reflected path is 10 m longer than the direct path when the mobile node 102 is to the left of −100 m, and the length of the reflected path is 15 m longer than the direct path when the mobile node is to the left of +700 m. Such a small difference between the length of the direct and reflected path is difficult to detect using a modem at the router that has a resolution of about 10 m.

FIGS. 10 and 11 show the standard deviation of the fourth scenario changing between 3 m and 4 m, while most of the estimates are affected by errors between −1 m and +3 m. The multi-path filter has difficulties separating the direct path and the secondary path fact that is reflected in the deviation of the peak of error frequency to +1 m.

In a fifth test scenario, the direct path between the mobile node 102 and the fixed router 107 is obstructed when the mobile node is between −500 and −100 m from the router and, between +300 and +700 m from the router. The reflected path is affected by a random extra path length of 50 m during the first obstruction and a random extra path length up to 75 m during the second obstruction. Also, high noise levels are present along the path 118. In this case, the quality of the direct signal is not very good and is affected by random error of ±10 m. This scenario could easily occur where the mobile node moves in heavily congested routes, such as a congested highway, where short term direct path losses are possible to short term fading while metallic bodies of vehicles surrounding the mobile node reflect and diffract the signal.

FIGS. 12 and 13 show a standard deviation between 5 and 7 m, while the errors are between +3 and −5 m. The chart of error distribution shows that the identified errors could be considered as resulting from two or three different processes centered close to zero, −1.0 and +1.5 m.

In a sixth test scenario, the fifth scenario may be repeated and the algorithm is set to restart when the value standard deviation of errors σ is larger than a preset value. In the fifth scenario, the restart trigger was set for σ>10 m, and in the sixth scenario the restart trigger was set to a new threshold value of σ>5 m. FIGS. 14 and 15 show that the effect of this change is catastrophic. The system restarts very often while the standard deviation changes between 3 to 5 m as requested. The distribution of errors shows that a large number of measurements are affected by errors as large as ±6 m. This scenario shows how important it is to provide a correct limit for requesting a restart of the algorithm. Field tests should reveal the correct value of this parameter.

Range data adjusted with this method has the advantage to be fully synchronized, as the filter is queried for distances to all support routers at the same moment. At this time each router is queried sequentially, a fact that makes use of uncorrelated data collected at various moments in time.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method of operation of a node in a wireless ad-hoc communications network for providing relative velocity values between nodes of said network, said method comprising at said node:
    receiving a plurality of signals from a second node of said network;
    calculating a distance between said node and said second node based on said received signals;
    maintaining a record of historical measurement data comprising past distance calculations by said node which were accepted by a filter adapted to eliminate erroneous measurements;
    predicting at least one relative velocity value between said node and said second node using at least one of said calculated distance and historical data;
    estimating an expected distance between said node and said second node based on said relative velocity; and
    comparing said calculated distance to said expected distance to determine whether to provide said at least one relative velocity value based on said calculated distance.

2. A method as claimed in claim 1, wherein:
    said step of receiving said signals comprises receiving said signals via at least one of direct and reflected paths between said node and said second node; and
    said method further comprises detecting, differentiating, and measuring said signals received by said node.

3. A method as claimed in claim 1, wherein said step of receiving said signals at said node comprises receiving said plurality of signals from said second node when said second node is in motion.

4. A method as claimed in claim 1, wherein said step of calculating said distance comprises calculating said distance between said node and said second node based on said received signals using a Time Of Arrival measurement technique.

5. A method as claimed in claim 1, wherein:
    said filter comprises first and second stages; and
    said step of maintaining said records of historical measurement data comprises at said first stage of said filter, receiving and comparing each said calculated distance value with said historical data and in response to said comparison, accepting or rejecting said calculated distance value.

6. A method as claimed in claim 5, wherein said step of maintaining said record of historical measurement data at said first stage of said filter comprises rejecting a calculated distance value when said value is greater than a set limit.

7. A method as claimed in claim 5, wherein said step of maintaining said record of historical measurement data at said first stage of said filter further comprises accepting a calculated distance value when said value is less than or equal to a set limit.

8. A method as claimed in claim 1, wherein:
    said filter comprises first and second stages; and
    said step of maintaining said record of historical measurement data at said second stage of said filter comprises receiving each accepted value from said first stage of said filter and including each said accepted value in said historical data.

9. A method as claimed in claim 1, wherein:
    said filter comprises first and second stages; and
    said step of maintaining said record of historical measurement data at second stage of said filter comprises periodically reviewing each value of said historical data and in response to said review, removing a value from said historical data when said value has become outdated.

10. A method as claimed in claim 1, wherein said step of maintaining said record of historical measurement data comprises creating a historical data matrix comprising historical measurement data.

11. A method as claimed in claim 1, wherein said step of predicting at least one relative velocity value between said node and said second node comprises predicting a relative velocity value based upon signal Time Of Arrival analysis when said node receives a number of direct signals from said second node wherein said number of direct signals is sufficient to allow an accurate distance measurement calculation between said node and said second node using said Time Of Arrival measurement technique.

12. A wireless ad-hoc communications network using relative velocity computed from historical data, said wireless ad-hoc communication network comprising:

a first node comprising:
- a transceiver for receiving a plurality of signals from a second node of said network;
- a distance calculating means for calculating a distance between said first and second nodes based on said received signals;
- a memory for maintaining a record of historical measurement data comprising past distance calculations by said first node which were accepted by a filter;
- said filter, adapted to eliminate erroneous measurements; and
- a relative velocity providing means, for estimating said relative velocity between said first and second nodes by estimating said expected distance between said first and second nodes based on said estimated relative velocity, and compare said calculated distance to said expected distance to determine whether to provide said at least one relative velocity value based on said calculated distance; and
- said second node communicatively counted to said first node.

13. A wireless ad-hoc communication network as claimed in claim 12, wherein:
- said transceiver of said first node is adapted to receive said signals via at least one of direct and reflected paths between said first and second nodes; and
- said first node is adapted to detect, differentiate and measure said signals.

14. A wireless ad-hoc communication network as claimed in claim 12, wherein said transceiver of said first node is adapted to receive said plurality of signals from said second node when said second node is in motion.

15. A wireless ad-hoc communication network as claimed in claim 12, wherein said distance calculating means of said first node is adapted to calculate said distance between said first and second nodes based on said received signals using a Time Of Arrival measurement technique.

16. A wireless ad-hoc communication network as claimed in claim 12, wherein:
- said filter comprises first and second stages; and
- said first stage of said filter is adapted to receive and compare each calculated distance value with said historical data and in response to said comparison, accept or reject each calculated distance value.

17. A wireless ad-hoc communication network as claimed in claim 16, wherein said first stage of said filter is adapted to reject a calculated distance value when said value is greater than a set limit.

18. A wireless ad-hoc communication network as claimed in claim 16, wherein said first stage of said filter is adapted to accept a calculated distance value when said value is less than or equal to a set limit.

19. A wireless ad-hoc communication network as claimed in claim 12, wherein:
- said filter comprises first and second stages; and
- said second stage of said filter is adapted to receive each accepted value from said first stage of said filter and include each said accepted value in said historical data.

20. A system as claimed in claim 12, wherein:
- said filter comprises first and second stages; and
- said second stage of said filter is adapted to periodically review each value of said historical data and in response to said review, remove a value from said historical data when said value has become outdated.

21. A wireless ad-hoc communication network as claimed in claim 12, wherein said first node is adapted to create a historical data matrix comprising historical measurement data.

22. A wireless ad-hoc communication network as claimed in claim 12, wherein said relative velocity providing means estimates a relative velocity measurement value based upon signal Time Of Arrival analysis when said first node receives a number of direct signals from said second node wherein said number of direct signals is sufficient to allow an accurate relative velocity calculation between said first and second nodes using said Time Of Arrival measurement technique.

23. A wireless ad-hoc communication network as claimed in claim 12 wherein said historical data comprise one or more sets of measured distances and an associated time when each measured distance was measured.

* * * * *